N. C. Hughes,
Corn-Planter.
Nº 74,092. Patented Feb. 4, 1868.
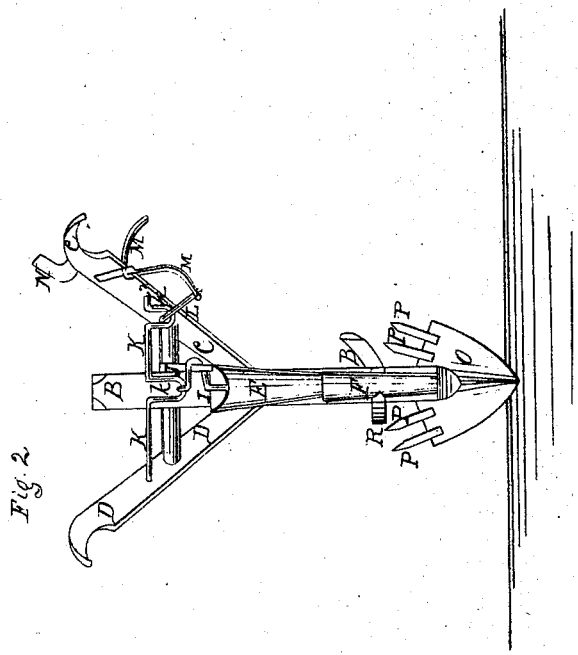
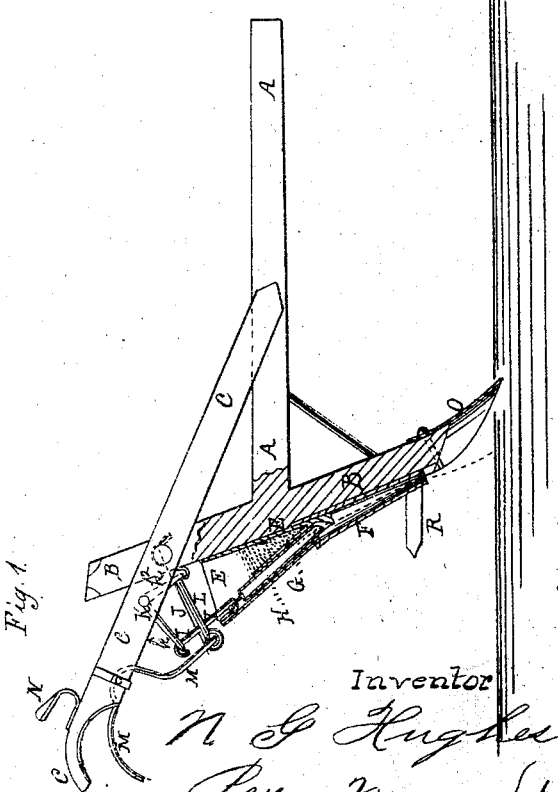
Witnesses
Theo Tusche
J. A. Service
Inventor
N. C. Hughes
Per Munn & Co.
Attorneys

United States Patent Office.

N. G. HUGHES, OF WAYNESBURG, PENNSYLVANIA.

Letters Patent No. 74,092, dated February 4, 1868; antedated January 27, 1868.

IMPROVEMENT IN CORN-PLANTERS.

*The Schedule referred to in these Letters Patent and making part of the same.*

TO ALL WHOM IT MAY CONCERN:

Be it known that I, N. G. HUGHES, of Waynesburg, in the county of Greene, and State of Pennsylvania, have invented a new and improved Corn-Planter; and I do hereby declare that the following is a full, clear, and exact description thereof, which will enable others skilled in the art to make and use the same, reference being had to the accompanying drawings, forming part of this specification, in which—

Figure 1 is a side view of my improved corn-planter, part being broken away to show the construction.

Figure 2 is a rear view of the same.

Similar letters of reference indicate like parts.

My invention has for its object to furnish an improved corn-planter, by means of which the ground may be marked, and the seed dropped and covered at the same time, and by the same operation; and it consists in the combination of the double tubes with the seed-box and guide-spout for dropping the grain; in the combination of the connecting-rod spring, crank-shaft, connecting-rod, and operating-lever, with each other, with the interior tube and frame of the plough; in the combination of the hand-cover or guard with the plough-handle; in the combination of the wings or scrapers with the standard, and in the combination of the fingers or bars with the plough; the whole being constructed and arranged as hereinafter more fully described.

A is the beam, B is the standard, and C and D are the handles, about the construction of which parts there is nothing new. E is the seed-box, which is secured to the rear side of the standard B, and the lower end of which enters the upper end of the guide-spout or tube F, through which the seed passes or is guided to the ground. G is a tube, placed in and secured to the lower part of the box E. The tube G has two openings through its side, one leading into the spout or tube F, and the other leading into the seed-box E. H is a tube, fitting accurately into the tube G. The bottom of the tube H is open, and it has an opening through its side, which, when the tube is lowered, corresponds with the opening through the tube G into the grain-box E. To the upper end of the tube H is attached the lower end of the connecting-rod I. J is a spring, one end of which is attached to the plough-frame, and its other end rests upon or is attached to a loop or arm, formed upon or attached to the connecting-rod I, so as to force and hold the tube H down. The upper end of the rod I is pivoted to a crank or arm, $k^1$, formed upon or attached to the shaft K, which works in bearings in the plough-handles C and D. $k^2$ is an arm or crank, formed upon or attached to the crank-shaft K, to which is pivoted one end of the connecting-rod L, the other end of which is pivoted to the lower end of the lever or trigger M. The middle part of the lever M is pivoted to the handle C in such a position that its upper end may be in a convenient position to be operated by the hand that holds the plough-handle C. By raising the upper end of the lever M, the inner tube, H, is raised, closing the hole through the tube G into the seed-box E, and opening the one leading into the spout F, allowing the seed to drop to the ground. Upon releasing the lever M, the tube H is forced down by the spring J, opening the hole into the seed-box, and allowing enough grain to form a hill to again enter the tube H, ready to be dropped. N is a hand-cover or guard, attached to the upper side of the handle C, in such a position that the hand may be pressed against it to force the plough further into the ground, at the same time that the same hand is operating the lever M to drop the grain. O is the plough, which is attached to the lower end of the standard B in the ordinary manner. To the upper edge of the plough O are attached upwardly-projecting bars or fingers, P, for the purpose or preventing clods, &c., from falling over the plough upon the planted grain, but at the same time allowing the loose earth to pass over freely. R are wings or scrapers, attached to the standard B in such positions as to scrape the fresh and loose earth turned up by the plough O, down over the dropped grain to cover it.

What I claim as new, and desire to secure by Letters Patent, is—

1. The combination of the tubes G and H with the seed-box E and spout or tube F, substantially as herein shown and described, and for the purpose set forth.

2. The combination of the connecting-rod I, spring J, crank-shaft K, connecting-rod L, and lever or trigger M, with each other, with the interior tube H and plough-handle C, substantially as herein shown and described, and for the purpose set forth.

3. The combination of the hand-cover or guard N with the plough-handle C, substantially as herein shown and described, and for the purpose set forth.

N. G. HUGHES.

Witnesses:
JNO. R. RUSH,
LEVI TAYLOR.